(12) United States Patent
Hirose

(10) Patent No.: US 7,238,887 B2
(45) Date of Patent: Jul. 3, 2007

(54) DC SUPERCONDUCTING CABLE

(75) Inventor: Masayuki Hirose, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 415 days.

(21) Appl. No.: 10/474,821

(22) PCT Filed: Dec. 17, 2002

(86) PCT No.: PCT/JP02/13166

§ 371 (c)(1),
(2), (4) Date: Oct. 15, 2003

(87) PCT Pub. No.: WO03/052774

PCT Pub. Date: Jun. 26, 2003

(65) Prior Publication Data

US 2004/0216915 A1  Nov. 4, 2004

(30) Foreign Application Priority Data

Dec. 18, 2001 (JP) .............................. 2001-384979
Dec. 12, 2002 (JP) .............................. 2002-360189

(51) Int. Cl.
*H01B 12/00* (2006.01)
(52) U.S. Cl. .................................... 174/125.1; 505/230
(58) Field of Classification Search ............. 174/125.1; 505/230–232
See application file for complete search history.

(56) References Cited

U.S. PATENT DOCUMENTS 5,932,523 A * 8/1999 Fujikami et al. ............ 505/231
6,262,375 B1 * 7/2001 Engelhardt et al. ......... 174/125.1
6,417,458 B1 * 7/2002 Mukoyama et al. ......... 174/125.1
2003/0029629 A1 * 2/2003 Spreafico et al. ........... 174/125.1

FOREIGN PATENT DOCUMENTS

| EP | 0 786 783 A1 | 7/1997 |
|---|---|---|
| EP | 1223590 A2 | 7/2002 |
| JP | 01309212 A | 12/1989 |
| JP | 09-134620 A | 5/1997 |
| JP | 09-134624 A | 5/1997 |
| JP | 11-120833 A | 4/1999 |
| JP | 2001-67950 A | 3/2001 |
| JP | 2001-202837 A | 7/2001 |
| JP | 2002-124141 A | 4/2002 |

OTHER PUBLICATIONS

John Demolder, Supplementary European Search Report, Nov. 22, 2006, Reference J166830/1152; Application No./Patent No. -2786109.5—PCT/JP213166.

* cited by examiner

*Primary Examiner*—Dean A. Reichard
*Assistant Examiner*—Jeremy C. Norris
(74) *Attorney, Agent, or Firm*—Foley & Lardner LLP

(57) ABSTRACT

A DC superconducting cable which is formed by housing stranded three cable cores in a thermal insulation pipe and in which structure for absorbing thermal contraction occurring during cooling can easily be achieved by adjusting the stranded state of the cores. Also, the structure in which three cores are housed together in the thermal insulation pipe enables the simultaneous cooling of the three cores, allowing the cooling system to be simplified.

15 Claims, 3 Drawing Sheets

Transmission capacity : 2×I×V

Transmission capacity : 3×I×V

DC SUPERCONDUCTING CABLE

TECHNICAL FIELD

The present invention relates to direct current (DC) superconducting cables and DC superconducting cable lines. More particularly, the invention relates to a DC superconducting cable which allows easy implementation of measures against thermal contraction occurring during cooling.

BACKGROUND ART

Three-core high temperature superconducting cables (three-core HTS cables) are known as conventional alternating current (AC) superconducting cables (see, for example, Japanese Patent Application Publication Nos. 9-134620 and 2001-202837). In these cables, a three-core stranded unit is housed in a thermal insulation pipe. Each cable core is formed of, sequentially from the center, a former, a superconducting cable conductor, an electrical insulating layer, and a shielding layer. Generally, a space formed in the former and a space formed between the thermal insulation pipe and each cable core serve as coolant channels. The superconducting cable conductor is formed by stranding superconducting wires in multilayers, and the spiral pitch and the winding direction are adjusted so that the impedances of the layers become uniform to allow a current to flow uniformly. The shielding layer is formed by using superconducting wires in a similar structure as the superconducting cable conductor.

As described above, in AC superconducting cables, a conductor is formed by winding the superconducting wires spirally so that the current may become radially uniform. However, AC loss is caused by the inductance, and the transmission current is restricted to that extent. Also, in the AC line system, the short-circuit current becomes large in the event of failure, and as a result, the temperature increases, which is also disadvantageous.

Accordingly, transmission using DC superconducting cables is also considered. DC superconducting cables are used for long-distance or bulk-power transmission. The conductor size must be increased in order to perform bulk-power transmission, and thus, the use of single-core cables has been considered.

However, known single-core DC superconducting cables have the following drawbacks.

(1) It is difficult to simplify the cooling system.

For conducting bipolar power transmission, a plurality of cables is required. However, since the superconducting cables are independently cooled in practice, the system becomes complicated, and the system cost also increases.

(2) It is difficult to take measures against the contraction of cable cores occurring during cooling.

In known AC cables, in order to provide an allowance for thermal contraction of cores, a three-core stranded unit is loosened in advance, or a spacer is interposed at the center of the stranded cores. However, in DC superconducting cables using single-core cables, measures against contraction cannot be taken by the adjustment of stranding. If the cores are not loosened, a tensile stress is generated in superconducting cable wires during cooling. This requires the use of wires resistant to this tensile stress. Thus, it is difficult to implement measures against the contraction.

DISCLOSURE OF INVENTION

Accordingly, it is a primary object of the present invention to provide a DC superconducting cable in which measures against the contraction are facilitated without the need to complicate a cooling system.

It is another object of the present invention to provide a superconducting cable line using the above-described DC superconducting cable.

According to the present invention, the above-described objects can be achieved by cooling a plurality of stranded cores at the same time.

That is, a DC superconducting cable of the present invention is formed by stranding three cores, each having a superconducting cable conductor and an electrical insulating layer.

Since the cable is formed by stranding three cores, a structure for absorbing thermal contraction occurring during cooling can easily be implemented by adjusting the state in which the cores are stranded.

Also, the three cores can be housed together in a thermal insulation pipe, and they can be cooled at the same time, thereby making it possible to simplify the cooling system.

The cable core is formed of, sequentially from the center, a former, a superconducting cable conductor, and an electrical insulating layer.

As the former, a solid former including stranded metal wires, or a hollow former using a metal pipe can be used. If a hollow former is used, the inside of the former can be used as a channel for a coolant.

The superconducting cable conductor may preferably be formed by spirally winding superconducting tapes on the former. A material which is a high-temperature oxide superconductor such as a Bi-based superconductor covered with a sliver sheath can be used as the superconducting tape wires. It is preferable that the superconducting tapes be wound in an even number of layers, the winding directions being changed alternately in the layers. In this case, the winding pitch is set to be the same for each pair of superconducting tapes of different winding directions or for each layer of tapes. Because of this conductor structure, a magnetic field in the axial direction leaking to the exterior can be canceled.

The electrical insulating layer may be formed by using various known insulating materials.

In the cable of the present invention, a shielding layer for magnetic shielding need not be provided for each core. In known AC superconducting cables, in order to reduce AC loss of conducing wires, a shielding layer for shielding a magnetic flux leaking to the outer periphery of a conductor is required. In the DC cable of the present invention, however, a shielding layer is not required. As a result, a cost reduction can be achieved by the nonemployment of a material for a shielding layer and omitting a winding step.

A ground layer may be disposed at the outer side of the insulating layer of each core. The ground layer may be formed by a conductive material, such as a metal. The major role of the ground layer is as follows. Generally, a thermal insulation pipe is grounded, and when a voltage is applied to the conductor of each core, thereby a voltage is also applied between the electrical insulating layer of each core and the thermal insulation pipe. Accordingly, a coolant present between the thermal insulation pipe and the electrical insulating layer carries a voltage, and if the applied voltage is high, the insulation property of the coolant influences the performance of the cable. Therefore, providing a ground layer at the periphery of the electrical insulating layer prevents the coolant from being subjected to the voltage, thereby the influence of the insulation property of the coolant upon the insulation performance of the cable can be prevented.

In performing transmission in a monopole system, the provision of a return-current conductor at the outer side of the electrical insulating layer is required. That is, the return-current conductor formed of superconducting tapes or wires at the outer side of the electrical insulating layer of each core can be used as a channel for a return current in monopole transmission. The return-current conductor may preferably have the same current capacity as that of the conductor with superconducting wires.

In the cable provided with such a return-current conductor, the current capacity may be different among the cores. When the cable is used in monopole transmission, each core can be designed according to the load, and power can be supplied according to the cores having different capacities. The specifications of the cores can be varied by changing, for example, the performance, the sectional area, or the number of superconducting tapes forming the superconducting cable conductor or the return-current conductor in compliance with the different current capacities.

The structure of stranding three cores enables providing an allowance for thermal contraction occurring during the cooling of the cable. For example, thermal contraction can be absorbed by a structure in which stranded cable cores are disposed in a snake-like shape, or the strand of the cable cores is loosened, or a spacer is disposed between the cable cores.

By using the above-described DC superconducting cable, both bipolar transmission and monopole transmission can be implemented. In this case, the use of the three cores can be selected as desired. When performing bipolar transmission, the respective cores can be used as a positive electrode core, a negative electrode core, and a neutral line core, the neutral line core being used as a spare for the positive electrode core and the negative electrode core. When performing monopole transmission, a superconducting cable provided with a return-current conductor for each core can be used as a channel for a return current. Regardless of whether bipolar transmission or monopole transmission is performed, three cores can be cooled at the same time, thereby making it possible to simplify the cooling mechanism. Further, since three cores are stranded, a means for compensating thermal contraction occurring during cooling can be easily provided.

BRIEF DESCRIPTION OF THE DRAWINGS

FIG. 2 illustrates the state in which cores are stranded.

BEST MODE FOR CARRYING OUT THE INVENTION

Embodiments of the present invention are described below.

Figure 1A:
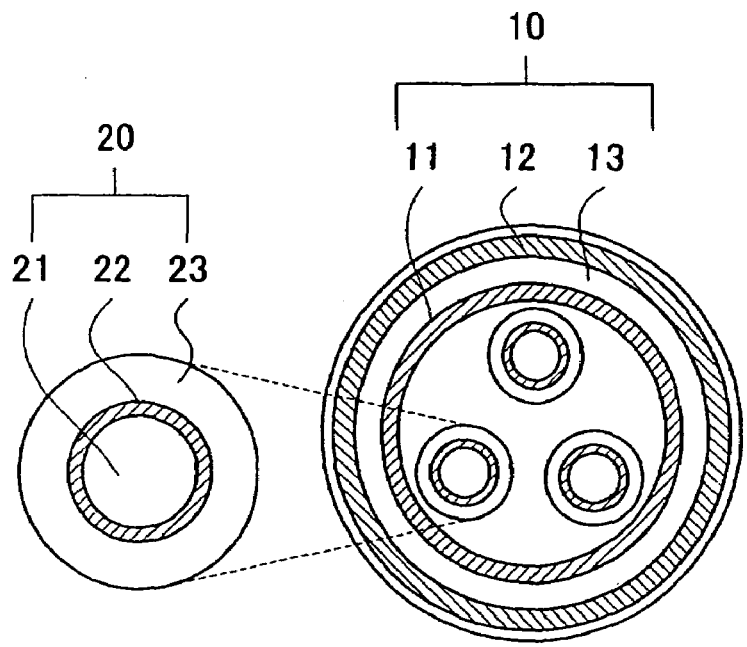
FIG. 1(A) is a sectional view illustrating a superconducting cable without a return-current conductor of the present invention.
Figure 1B:
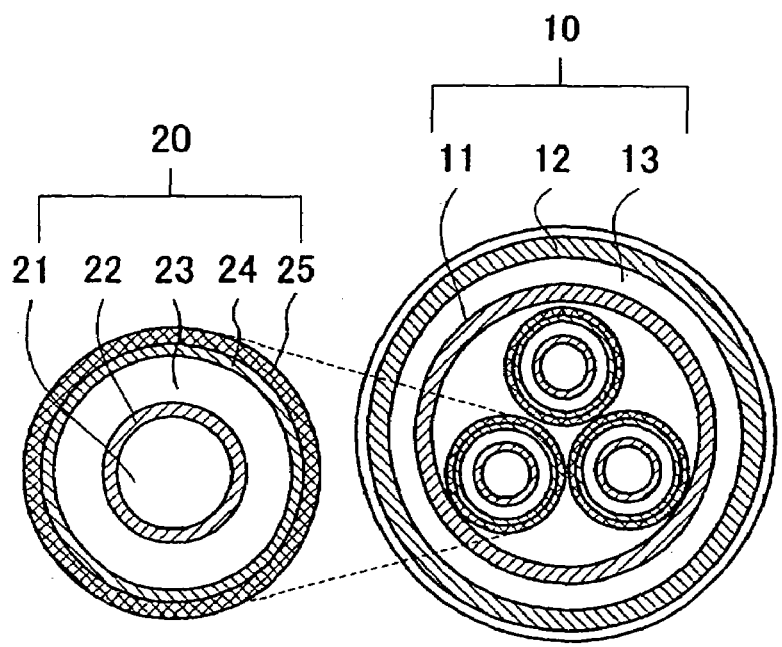
FIG. 1(B) is a sectional view illustrating a superconducting cable with a return-current conductor of the present invention.

FIG. 1(A) is a sectional view illustrating a superconducting cable without a return-current conductor according to the present invention. FIG. 1(B) is a sectional view illustrating a superconducting cable with a return-current conductor according to the present invention.

[Overall Structure]

In this cable, three cable cores 20 are stranded together and are housed in a thermal insulation pipe 10.

[Thermal Insulation Pipe]

The thermal insulation pipe 10 is a double pipe structure formed by an inner pipe 11 and an outer pipe 12. A vacuum thermal insulation layer 13 is disposed between the inner pipe 11 and the outer pipe 12. Within the vacuum thermal insulation layer, a laminated body formed of a plastic net and a metal foil, i.e., so-called "super insulation", is disposed. A space formed between the inner side of the inner pipe 11 and the core 20 serves as a channel for a coolant, such as liquid nitrogen. If necessary, an anticorrosion layer may be formed with a material such as polyvinyl chloride around the outer periphery of the thermal insulation pipe.

[Core]

As shown in FIG. 1(A), each core 20 housed in the thermal insulation pipe is formed of, sequentially from the center, a former 21, a superconducting cable conductor 22, and an electrical insulating layer 23. If the voltage applied to the conductor is high, it is preferable that a ground layer (not shown) grounded at the outer side of the insulating layer 23 be provided. Further, as shown in FIG. 1(B), a return-current conductor 24 and a protective layer 25 may be provided at the outer side of the electrical insulating layer 23.

<Former>

A solid former made of stranded metal wires, or a hollow former made of a metal pipe can be used as the former 21. Stranded copper wires may be used as the solid former, for example. If a hollow former is used, the inside of the former can be used as a channel for a coolant.

<Superconducting Cable Conductor>

High-temperature oxide superconductors of a tape-like shape, such as Bi-based superconductor each covered with a silver sheath, can be suitably used for the superconducting cable conductor 22. The tape wires are wound on the former in multilayers so as to form a conductor. It is preferable that the superconducting tapes be wound so as to form an even number of layers, and the winding direction of the tapes be opposite alternately in layers. Such multilayer structure enables decrease in the leakage of a magnetic flux to the exterior. Thus, unlike an AC cable, it is not necessary to consider whether the currents become radially uniform in the individual layers, and therefore the winding pitch need not be the same in all the layers, provided that at least one pair of tapes having different winding directions has the same pitch.

<Electrical Insulating Layer>

The electrical insulating layer 23 is formed on the outer periphery of the above-described superconducting cable conductor 22. The electrical insulating layer 23 can be formed by winding kraft paper or semi-synthetic insulating paper (for example, PPLP (registered trademark) produced by Sumitomo Electric Industries, Ltd.). In the cable of the present invention, it is not necessary to provide a shielding layer for magnetic shielding at the outer side of the electrical insulating layer 23. Generally, in the cable cores of an AC cable, a shielding layer is formed by winding superconducting tapes on the outer side of an electrical insulating layer, and the generation of a magnetic field leaking to the exterior is cancelled by inducing into the shielding layer a current whose magnitude is substantially the same as that of the superconducting cable conductor and whose direction is opposite to the direction of the current in the superconducting cable conductor. In the cable of the present invention, as discussed above, since the generation of an external magnetic field is suppressed by the winding structure of superconducting tapes forming the conductor itself, it is unnecessary to provide a shielding layer for magnetic shielding using superconducting tapes. It is preferable that a ground layer, which is used for grounding, be provided at the outer side of the electrical insulating layer 23. This ground layer prevents a voltage from being applied to a coolant existing between the thermal insulation pipe and the electric insulating layer. The ground layer can be formed by winding, for example, a metal tape or another conductive or semiconductive tape.

<Return Current Conductor>

To implement monopole transmission by using the cable of the present invention, the return-current conductor 24 is required. In a DC cable line, a reciprocating channel for a current is required, and a return-current conductor is provided as a channel for a return current in monopole transmission in which three cores are used independently. The return-current conductor 24 is formed by superconducting wires similar to those for the conductor 22 with superconducting wires, and has a current capacity comparable to that of the conductor 22 with superconducting wires. If the return-current conductor 24 is used, the protective layer 25 formed by an insulating material must be provided at the outer side of the return-current conductor 24. The protective layer 25 mechanically protects the return-current conductor 24, and also prevents shunting of a return current to the thermal insulation pipe 10 by insulating the return current conductor 24 from the thermal insulation pipe (inner pipe 11).

[Stranded Structure of Cores]

The structure of stranding three cores enables providing a means for achieving compensation of thermal contraction occurring during the cooling of the cable. For example, thermal contraction can be absorbed by a structure in which stranded cable cores are disposed in a snake-like form, or the strand of the cable cores is loosened, or a spacer is disposed between the cores.

The technique disclosed in Japanese Patent Application Publication No. 1-309212 can be applied for disposing stranded cable cores in a snake-like form. For example, projections are formed in the thermal insulation pipe such that the stranded cores inserted thereinto are housed in a snake-like form.

Figure 2A:
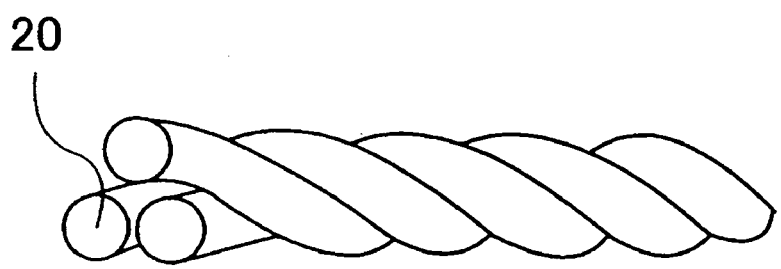
FIG. 2(A) illustrates the state in which stranded cores are loosened.

Thermal contraction can also be absorbed by the structure in which the strand of cable cores is loosened. When the cores 20 are contracted during cooling, as shown in FIG. 2(A), the strand becomes tightened to such a degree as to eliminate the loosened portion, thereby absorbing the thermal contraction and preventing a large amount of tension from being imposed on the cores.

The technique disclosed in Japanese Patent Application Publication No. 9-134624 can be used as a method for loosening the strand of cores. According to this technique, stranded cores are housed in a thermal insulation pipe, and a coolant is supplied to the pipe so as to contract the cores. In this case, the cores are disposed substantially linearly from one end to the other end of the thermal insulation pipe, and the two ends of the thermal insulation pipe are covered with caps. Thereafter, the temperature of the thermal insulation pipe is increased so that the cores are meandered in a snake-like form in the thermal insulation pipe, thereby loosening the strand.

Another means for loosening the strand of cores is the technique disclosed in Japanese Patent Application Publication No. 2001-67950. According to this technique, in which a process of covering the outer periphery of the cores with a thermal insulation pipe (inner pipe) is provided, the speed of the covering step or a downstream step thereof is set to be lower than the speed at which the cores are supplied, thereby the strand of the cores is loosened such that thermal contraction can be absorbed during cooling.

More specifically, there are the following two approaches.

1. The speed at which a thermal insulation pipe is formed is set to be lower than the speed at which the stranded cores are supplied, whereby the strand of the cores is loosened so that the thermal contraction thereof is absorbed during cooling.

2. A step of corrugating the thermal insulation pipe is further provided, and by setting the corrugating speed to be lower than the speed at which the stranded cores are supplied, the strand of the cores is loosened such that the thermal contraction is absorbed during cooling.

Figure 2B:
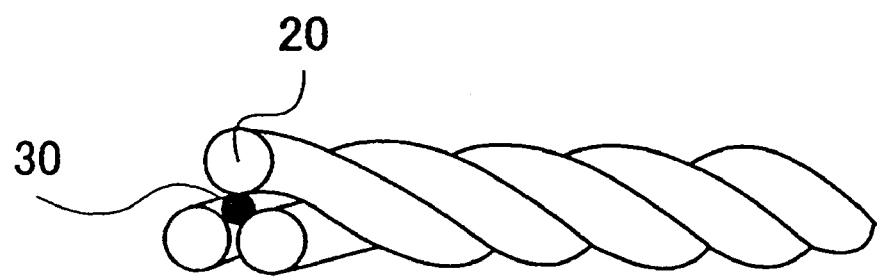
FIG. 2(B) illustrates the state in which cores are stranded with a spacer therebetween.

The technique disclosed in Japanese Patent Application Publication No. 9-134620 can be used for interposing a spacer between cores. As shown in FIG. 2(B), cores are stranded by interposing a spacer 30 at the center of the cores. At room temperature, the cores 20 are maintained by the spacer 30 in a stranded state similar to that in which they are loosened. During cooling, the cores 20 are contracted, as well as the spacer 30. As the outer diameter of the spacer 30 is decreased, the stranded cores 20 are tightened, thereby absorbing thermal contraction.

[Cable Line]

By using the above-described DC superconducting cable, both bipolar transmission and monopole transmission can be implemented. Regardless of whether bipolar transmission or monopole transmission is performed, the use of the respective three cores can be selected as desired.

Figure 3:
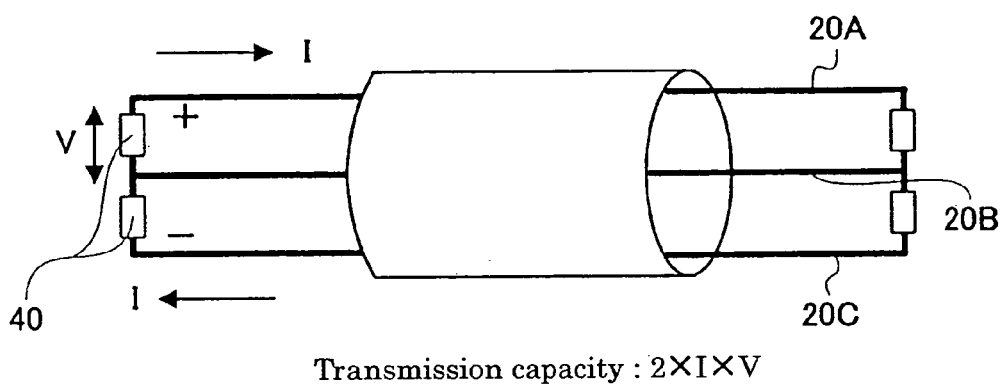
FIG. 3 is a schematic diagram illustrating a line of the present invention used in a bipolar transmission system.

A line used in the bipolar transmission system is described below with reference to FIG. 3. In this example, the structures of the three cores are the same, and a line is formed by using a superconducting cable similar to that shown in FIG. 1(A). That is, each core is formed of, sequentially from the center, a former, a conductor with superconducting wires, and an electrical insulating layer. It is preferable, however, that a ground layer be provided at the outer periphery of the electrical insulating layer. Generally, a thermal insulation pipe is grounded. Considering the potential distribution between this thermal insulation pipe and the conductor, a coolant which is present between the thermal insulation pipe and the electrical insulating layer carries a potential distribution, as in the electrical insulating layer of each core. In this case, if the transmission voltage is high, the insulation performance of the coolant may run into a problem. Accordingly, by providing a ground layer at the periphery of the electrical insulating layer of each core, the application of the voltage to the coolant can be prevented. In principle, a current does not flow in the ground layer. Thus, a superconductor need not be used as the material for the ground layer, and a regular conductor, such as a metal, can be used.

The three cores are used as a positive electrode core 20A, a neutral line core 20B, and a negative electrode core 20C.

A power source 40 is disposed between the positive electrode core 20A and the neutral line core 20B and between the neutral line core 20B and the negative electrode core 20C. The neutral line core 20B is grounded. Such grounding may be done only at one end or both ends of the neutral line core 20B. Normally, transmission is performed by using the positive electrode core 20A and the negative electrode core 20C. In this case, the transmission capacity results in $2 \times I \times V$, where I indicates the transmission current, and V indicates the transmission voltage. In the event of a failure in either of the positive electrode core 20A or the negative electrode core 20C, a current flows in the neutral line core 20B.

In the past, for performing bipolar transmission by using single-core DC cables, it has been necessary to use a plurality of cables, and to cool each cable independently. In contrast, according to the cable of the present invention, one cable has a three-core structure, and the three cores can be cooled at the same time, thereby simplifying the cooling system.

Figure 4:
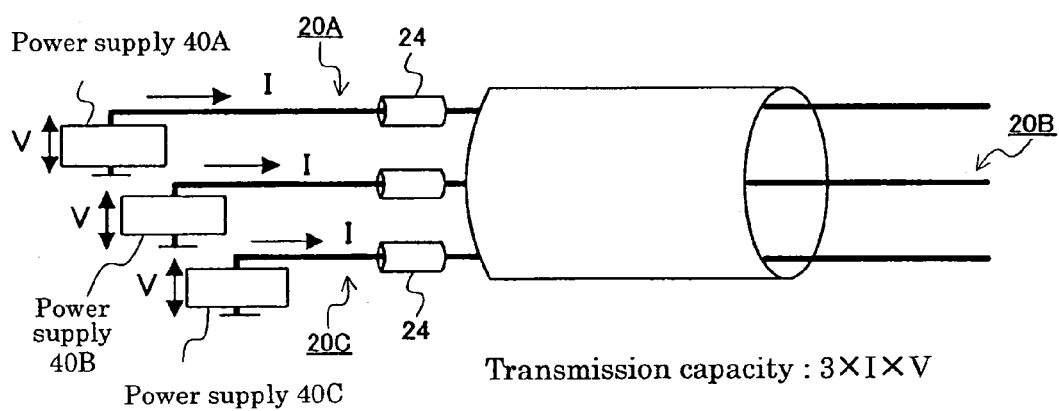
FIG. 4 is a schematic diagram illustrating a line of the present invention used in a monopole transmission system.

The superconducting cable line of the present invention performing monopole transmission is shown in FIG. 4. In this embodiment, the line is formed by using a cable having the same structure as that of the superconducting cable shown in FIG. 1(B). That is, each core is formed of, sequentially from the center, a former, a superconducting cable conductor, an electrical insulating layer, a return-current conductor, and a protective layer. Power sources 40A through 40C are connected to the cores 20A through 20C, respectively, so as to supply power. The specifications of the power sources 40A through 40C may be the same or may be different. A return-current conductor 24 for each of the cores 20A through 20C is formed of superconducting wires similar to those used for the superconducting cable conductor, and has a transmission capacity comparable to that of the superconducting cable. The return-current conductor 24 is grounded.

The return-current conductor 24 is used as a channel for a return current, in which case, the leakage of a magnetic flux to the exterior of the cores can be canceled. While in FIG. 4, only part of the return-current conductor 24 is schematically shown in the longitudinal direction, in practice, the return-current conductor 24 is disposed in the entire longitudinal direction.

In the line used in the monopole transmission system shown in FIG. 4, each core can be used for transmission. Accordingly, the transmission capacity results in $3 \times I \times V$, which is 1.5 times as large as the transmission capacity of a line used in the bipolar transmission system.

In the line of this embodiment, the transmission capacity of the cores 20A through 20C may be the same or may be different. That is, since transmission is performed independently by each core in the monopole transmission system, the transmission capacity of the cores 20A through 20C need not be the same, and the cores 20A through 20C serve as transmission lines for a maximum of three power sources. Thus, the conductor structures of the cores 20A through 20C can be different according to the load. For example, the transmission capacities of the cores 20A through 20C may be differentiated as 2000 A, 1500 A, and 1000 A, respectively. The specifications of the cores 20A through 20C can be varied by changing, for example, the performance, the sectional area, or the number of superconducting tapes that constitute the conductor or the return-current conductor.

According to the line of this embodiment, three cores can be cooled at the same time, and the specifications of the cores can be independently set as desired. Thus, a cable can be designed in accordance with the power of the load, thereby reducing the total cost of the line.

INDUSTRIAL APPLICABILITY

As described above, according to the DC superconducting cable and line of the present invention, a plurality of cores can be cooled at the same time. Thus, the cooling system can be simplified, the cooling efficiency can be enhanced, and the cost of the cable itself can be reduced compared to a system in which each of single-core cables is cooled independently.

Also, since a plurality of cores are stranded, by adjusting the state in which the cores are stranded, a structure for absorbing thermal contraction during cooling can easily be provided.

The invention claimed is:

1. A DC superconducting cable for use in a bipolar transmission system, said DC superconducting cable comprising:
    at least three cores, each of said at least three cores having a respective superconducting cable conductor and a respective electrical insulating layer;
    wherein the at least three cores are stranded together;
    wherein a first core of the at least three cores is connected to a first power source to act as a positive electrode core;
    wherein a second core of the at least three cores is connected to a second power source to act as a negative electrode core; and
    wherein a third core of the at least three cores is connected to ground to act as a neutral line core.

2. The DC superconducting cable according to claim 1, wherein the stranded structure of the at least three cores provides an allowance for thermal contraction of the at least three cores that may occur during a cooling of the at least three cores.

3. The DC superconducting cable according to claim 2,
    wherein the respective superconducting cable conductor of each of the at least three cores comprises an even number of layers of corresponding superconducting tapes;
    wherein winding directions of the corresponding superconducting tapes in each of the layers of the respective superconducting cable conductor of each of the at least three cores alternate among adjacent layers;
    wherein at least one pair of superconducting tapes of the corresponding superconducting tapes of the respective cable conductor of each of the at least three cores that are wound in different winding directions have a same winding pitch;
    wherein winding pitches of the corresponding superconducting tapes in the layers of the respective superconducting cable conductor of each of the at least three cores are not the same for all of the layers; and
    wherein the respective superconducting cable conductor of each of the at least three cores is not provided with a corresponding shielding layer formed of superconducting tapes.

4. The DC superconducting cable according to claim 1,
    wherein the respective superconducting cable conductor of each of the at least three cores comprises an even number of layers of corresponding superconducting tapes;
    wherein winding directions of the corresponding superconducting tapes in each of the layers of the respective superconducting cable conductor of each of the at least three cores alternate among adjacent layers;

wherein at least one pair of superconducting tapes of the corresponding superconducting tapes of the respective cable conductor of each of the at least three cores that are wound in different winding directions have a same winding pitch;

wherein winding pitches of the corresponding superconducting tapes in the layers of the respective superconducting cable conductor of each of the at least three cores are not the same for all of the layers; and wherein the respective superconducting cable conductor of each of the at least three cores is not provided with a corresponding shielding layer formed of superconducting tapes.

5. The DC superconducting cable according to claim 1, wherein the first power source is a same power source as the second power source.

6. The DC superconducting cable according to claim 1, wherein the third core is connected between the first power source and the second power source.

7. The DC superconducting cable according to claim 6, wherein the third core is able to act as the negative electrode core if the second core fails.

8. The DC superconducting cable according to claim 1, wherein the at least three cores are braided together.

9. The DC superconducting cable according to claim 1, wherein each of the at least three cores further comprises a respective ground layer formed of a conductive material that is not a superconductor and that is disposed on an outer side of said respective electrical insulating layer.

10. A DC superconducting cable, comprising:

at least three cores, each of the at least three cores comprising a respective superconducting cable conductor and a respective electrical insulating layer;

wherein the at least three cores are stranded together;

wherein each of the at least three cores further comprises a respective ground layer formed of a conductive material that is not a superconductor and that is disposed on an outer side of said respective electrical insulating layer;

wherein the respective superconducting cable conductor of each of the at least three cores comprises an even number of layers of corresponding superconducting tapes;

wherein winding directions of the corresponding superconducting tapes in each of the layers of the respective superconducting cable conductor of each of the at least three cores alternate among adjacent layers, wherein at least one pair of superconducting tapes of the corresponding superconducting tapes of the respective cable conductor of each of the at least three cores that are wound in different winding directions have a same winding pitch, wherein winding pitches of the corresponding superconducting tapes in the layers of the respective superconducting cable conductor of each of the at least three cores are not the same for all of the layers; and wherein the respective superconducting cable conductor of each of the at least three cores is not provided with a corresponding shielding layer formed of superconducting tapes.

11. A DC superconducting cable, comprising:

at least three cores, each of the at least three cores comprising a respective superconducting cable conductor and a respective electrical insulating layer;

wherein the at least three cores are stranded together;

wherein each of the at least three cores further comprises a respective ground layer formed of a conductive material that is not a superconductor and that is disposed on an outer side of said respective electrical insulating layer;

wherein the a current capacity is different among each of the at least three cores.

12. A bipolar transmission system, comprising:

a first power source;

a second power source; and a DC superconducting cable, said DC superconducting cable comprising:

at least three cores, each of the at least three cores having a respective superconducting cable conductor and a respective electrical insulating layer, said at least three cores stranded together;

wherein a first core of the at least three cores is connected to the first power source to act as a positive electrode core;

wherein a second core of the at least three cores is connected to the second power source to act as a negative electrode core; and wherein a third core of the at least three cores is connected between the first power source and the second power source to act as a neutral line core.

13. The bipolar transmission system according to claim 12, wherein the third core is able to act as the negative electrode core if the second core fails.

14. The bipolar transmission system according to claim 12, wherein the at least three cores of the DC superconducting cable are braided together.

15. The bipolar transmission system according to claim 12, wherein each of the at least three cores of the DC superconducting cable further comprises a respective ground layer formed of a conductive material that is not a superconductor and that is disposed on an outer side of said respective electrical insulating layer.

* * * * *